July 6, 1954        H. M. GALLAWAY        2,683,017
TURBINE CYLINDER JOINT
Filed April 27, 1949                           2 Sheets-Sheet 1
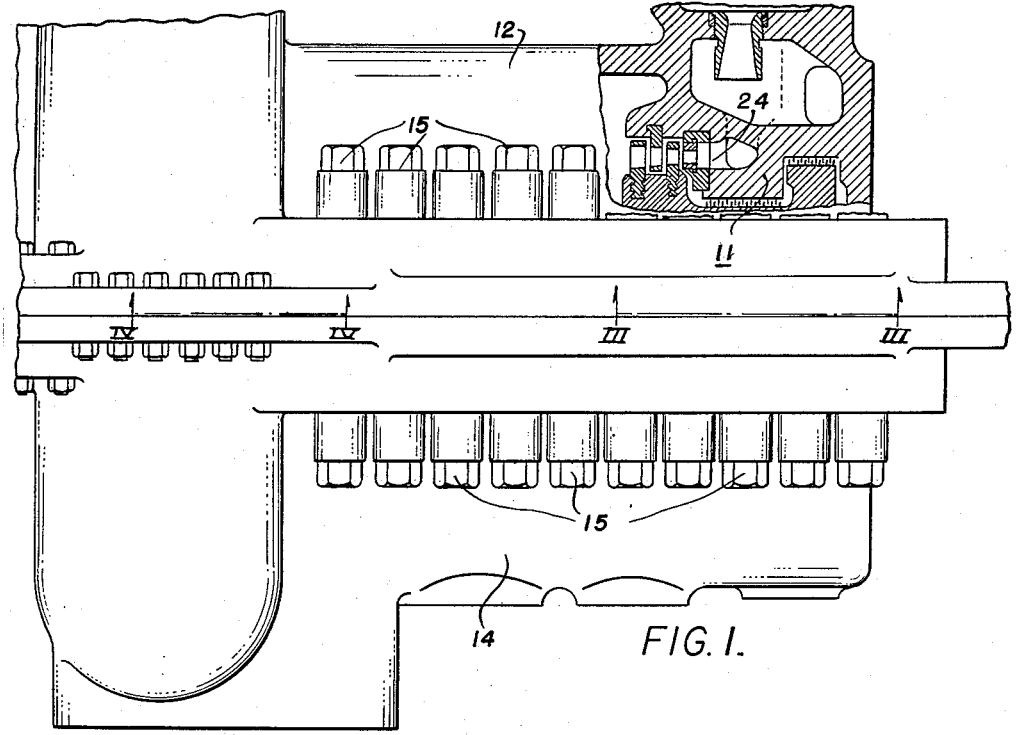
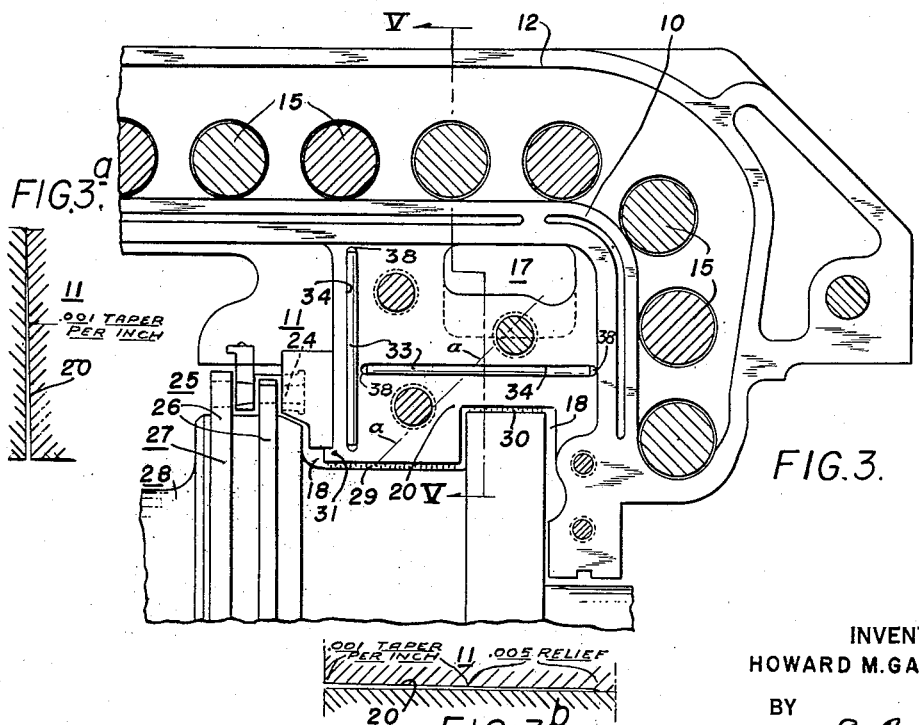
INVENTOR
HOWARD M. GALLAWAY
BY
ATTORNEY July 6, 1954   H. M. GALLAWAY   2,683,017
TURBINE CYLINDER JOINT
Filed April 27, 1949   2 Sheets-Sheet 2
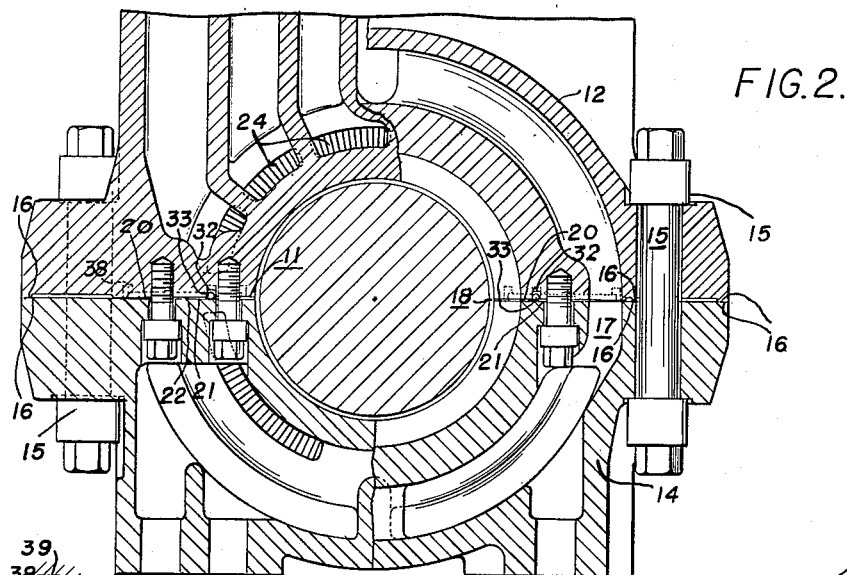
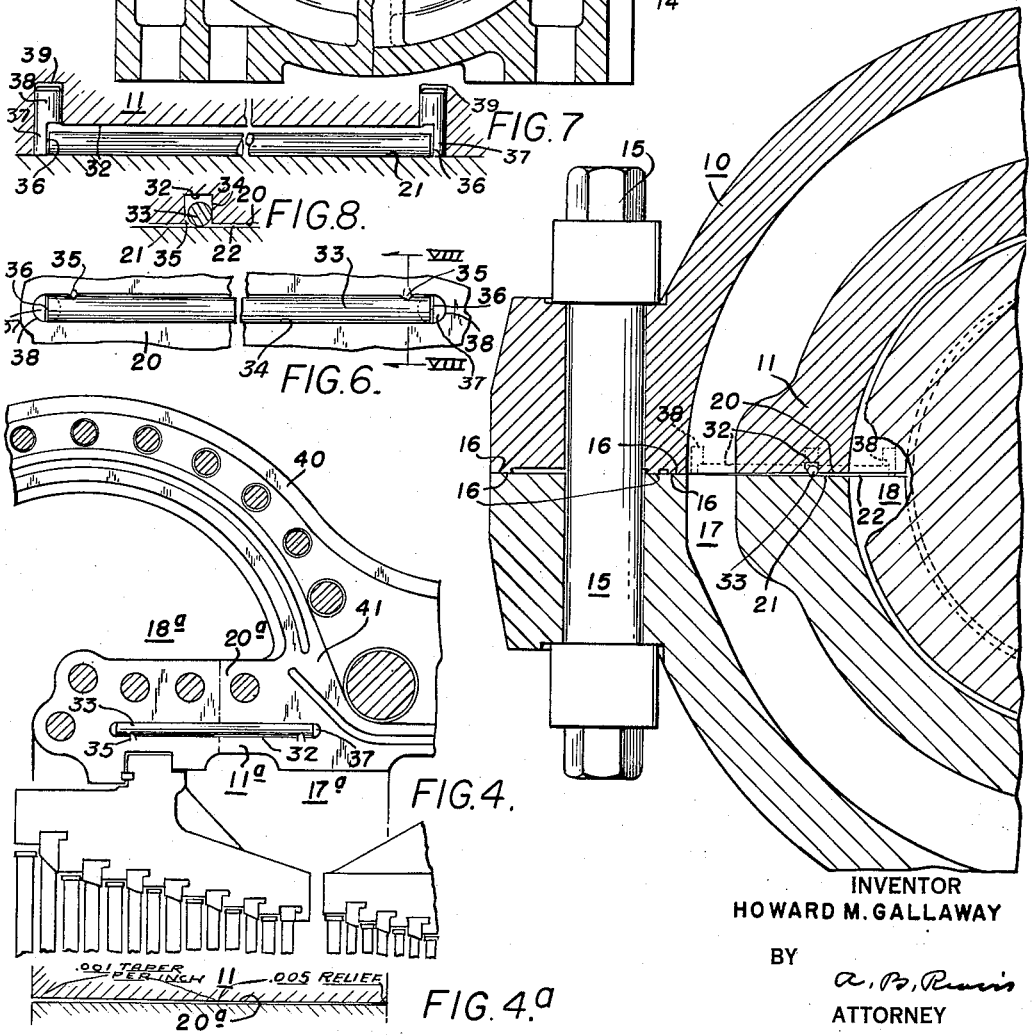
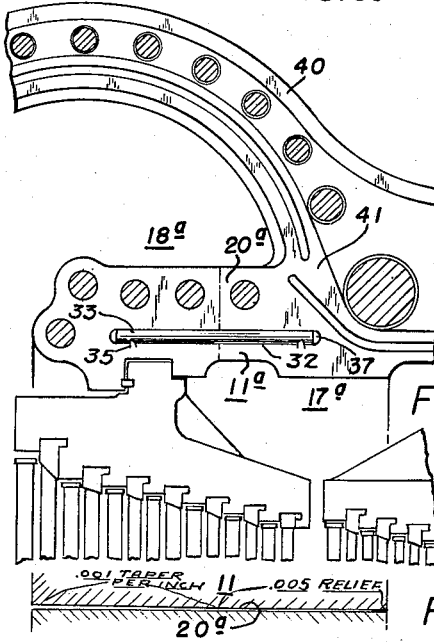
INVENTOR
HOWARD M. GALLAWAY
BY
ATTORNEY Patented July 6, 1954

2,683,017

UNITED STATES PATENT OFFICE 2,683,017

TURBINE CYLINDER JOINT

Howard M. Gallaway, San Carlos, Calif., assignor to Westinghouse Electric Corporation, East Pittsburgh, Pa., a corporation of Pennsylvania Application April 27, 1949, Serial No. 89,880

6 Claims. (Cl. 253—39)

The present invention relates to a turbine cylinder having an integral annular portion or portions extending inwardly thereof and separating spaces for steam at different pressures, and it has for an object to relieve each annular portion at the joint to provide expansion space to avoid opening up of joint surfaces compressively engaged by the cylinder bolts and to provide roller or rollers disposed in groove or grooves in the upper cylinder half and each roller having sealing engagement with one side wall of its groove and with the lower cylinder half to minimize leakage, through the clearance space, from the steam space of higher pressure to that of lower pressure.

In steam turbine practice, it is frequently necessary to thicken the cylinder wall structure to provide separated steam passages or spaces. For example, the initial impulse stage may require that the cylinder wall structure extend inwardly to define the dummy clearance space and to provide spaces or passages for supplying steam to nozzles. Because of the radial thickness of the wall structure on this account, difficulty may be experienced in maintaining a tight cylinder joint unless room for expansion is provided. For this reason, the upper and lower cylinder halves include an outer wall structure having contacting faces held compressively engaged by cylinder bolts and inner wall structure having the opposed faces at the joint spaced to provide expansion clearance. Where the wall structure is formed with an interior steam passage extending across the joint, considerable leakage may occur through expansion clearance unless measures to the contrary are taken. Further, at the exhaust end of the turbine, there may be annular structure separating spaces for steam at different pressures and which is similarly relieved at the joint to avoid opening up of joint surfaces held compressively engaged by the cylinder bolts. Accordingly, a further feature of the invention is to minimize leakage through such clearance space or spaces by means of a sealing roller or rollers capable of sealing against surfaces of the upper and lower cylinder halves with variation in the expansion clearance. To provide for such sealing action, each roller is disposed in a groove formed in the upper cylinder half, it bears on the lower cylinder half at the joint and it is arranged to engage the groove side wall at right angles to said surface to effect sealing of the joint to minimize leakage from the higher pressure steam space to the lower pressure space of the turbine. Accordingly, a more particular object of the invention is to provide apparatus of this character operating in this manner.

A further object of the invention is to provide a turbine cylinder having a sealing roller of the above character with means carried by the upper cylinder half for retaining the roller in place with respect thereto when the upper cylinder half is lifted from the lower cylinder half.

Another object of the invention is to provide a roller sealing arrangement of the above character wherein the ends of the groove for the roller are formed by semi-cylindrical portions of plugs fixedly secured to the upper cylinder half.

The foregoing and other objects are effected by the invention as will be apparent from the following description and claims taken in connection with the accompanying drawings, forming a part of this application, in which:

Fig. 1 is a side elevational view of a turbine sectioned to show interior structure at the high-pressure end;

Fig. 2 is a transverse sectional view taken through the high-pressure end of a turbine;

Fig. 3 is an inverted plan view of a portion of the upper cylinder half and viewed in the direction of the arrows III—III of Fig. 1;

Figs. 3a and 3b are diagrammatic views showing radial and axial taper of the expansion clearance illustrated in an exaggerated manner;

Fig. 4 is a view similar to Fig. 3 but viewed in the direction of the arrows IV—IV of Fig. 1;

Fig. 4a is a view showing axial taper of the expansion clearance of Fig. 4;

Fig. 5 is a sectional detail view taken along the line V—V of Fig. 3; and

Figs. 6, 7 and 8 are detail views showing a roller seal, Fig. 8 being a section along the line VIII—VIII of Fig. 6.

In the drawings, there is shown a turbine cylinder comprising outer cylinder structure 10 and inner annular structure 11. The cylinder includes upper and lower halves 12 and 14 and connecting bolts 15 for compressively engaging the cylinder structure joint faces 16, 16.

The inner annular structure 11 separates spaces, at 17 and 18, for steam at different pressures and it has upper and lower joint faces 20 and 21, which, with the cylinder cold, are spaced apart to provide clearance 22 (Fig. 5) for expansion to avoid, due to expansion of such inner annular structure relative to the outer structure, opening up or disturbing the bolted face-to-face contact relation of the joint faces 16, 16 of the outer cylinder structure.

The expansion clearance is preferably provided by having the upper cylinder half faces 20 relieved, that is, with the lower cylinder half faces 21 at the joint plane, the upper faces 20 are spaced thereabove to the extent necessary to provide expansion space where required. Where there is a considerable thickness of material of the inner annular structure, the surface 20 may be inclined inwardly and upwardly to provide inward divergency of the space 22, as shown in Fig. 5.

In this connection, referring to Fig. 3, steam enters the space, at 18, at the discharge temperature and pressure of the nozzles 24 of the initial impulse stage, at 25, including moving blades 26 carried by the disk portion 27 of the rotor 28. The space, at 18, has dummy packing 29 and 30 therein and it includes a portion at the discharge side of the packing. Upon initially turning the steam on, the inner corner 31 of the inner structure is immediately subject to temperature of nozzle discharge steam and, for this reason, the relief of the face 20, at least to the left of the diagonal line a, is provided by inward radial taper, as shown by projection Fig. 3a and by axial taper toward the disk 27, as shown by the projection Fig. 3b. Fig. 3b shows that clearance portions of less thickness, or subject to smaller transient temperature differences, may have untapered clearance.

Where, as shown, the inner annular structure separates spaces 17 and 18 for steam at different pressures, the expansion clearance 22 would result in leakage from the higher pressure space 17 to the lower pressure space 18, and a feature of the present invention is the interposition of sealing means to minimize such leakage.

The sealing means for the aforesaid purpose comprises a groove or grooves 32 formed in the upper cylinder half and opening through the joint face 20 and a roller 33, preferably made of stainless steel, in each groove and normally bearing on the lower cylinder half joint face 21. Each groove is straight and is of uniform width from end to end. The roller diameter is slightly less than the groove width. Each groove is disposed so as to extend lengthwise in a direction transverse to that of leakage from the high-pressure space to the low-pressure space.

Assuming the roller 33 to be spaced from the groove wall 34 and that leakage is occurring through the clearance space, friction of steam flowing in the groove and over the roller, as well as a slightly higher pressure at the front side of the roller as compared to the back side thereof causes rolling of the roller to sealing position in which it has line sealing engagement with the inner annular structure joint face 21 of the lower cylinder half and line sealing engagement with the upper cylinder half groove wall 34.

The pressure bias on the roller urging it to sealed position progressively increases with restriction of the leakage area and is a maximum in sealed position in which large components maintain the roller sealed against the surfaces 34 and 21.

As the groove wall 34 is arranged substantially at right angles to the face 21, it will be apparent that, irrespective of variation in thickness of the clearance space due to temperature changes, the roller will nevertheless preserve its sealing relation with respect to the lower cylinder half and with the upper cylinder half groove wall.

Preferably, each roller is retained in place in its groove formed in the upper cylinder half. While any suitable retaining means may be employed for this purpose, as shown, the wall structure is deformed at one side of the groove to provide stake portions 35 (Figs. 6 and 8) spaced from the other side of the groove a distance less than the roller diameter.

To provide each groove 32 having close end clearance with respect to the end of its roller, the ends of each groove are formed by flat faces 36 of semi-cylindrical portions 37 of plugs 38 mounted in drilled openings 39 formed in the cylinder inner annular structure. Preferably, before milling a groove, spaced openings 39 are drilled, the groove 32 is milled to connect the openings, and plugs 38 are inserted in the openings so that the flat faces 36 thereof form the groove ends.

The disposition of sealing rollers depends upon the relative arrangement of spaces, at 17 and 18. In Fig. 3, where the space 17 extends across the joint plane and supplies nozzles in the lower cylinder half and the space 18 bounds the side of the structure 11 adjacent to the disk 27 as well as the interior cylindrical surface of such structure, each face 20 preferably has two sealing rollers, one extending radially and sealing against leakage in an axial direction and the other extending parallel to the turbine axis and sealing against radial leakage toward the rotor.

Where, as shown in Fig. 4, the spaces, at 17a and at 18a, overlap axially, sealing to oppose radial leakage is adequate and a single sealing roller at each side of the turbine and arranged parallel to the turbine axis is sufficient. In Fig. 4, the inner annular structure 11a at the exhaust end of the turbine carries blading, it extends axially, it separating the steam spaces, at 17a and 18a, the steam space 17a being separated by blading from the exhaust space 18a bounded by the exhaust housing portion 40 of the cylinder structure and into which the axially-extending annular structure 11a protrudes. As the annular structure is integral with the junction portion 41 of the cylinder structure proper and the exhaust housing and as the annular structure is exposed for heating by steam passing through the turbine, differential expansion of the latter would result in impairment of steam tightness of the joint unless provision is made to accommodate expansion. Therefore, the annular structure 11a is relieved toward its inner end, the relief preferably involving a surface 20a spaced to the extent required above the joint plane.

While the invention has been shown in but one form, it will be obvious to those skilled in the art that it is not so limited, but is susceptible of various changes and modifications without departing from the spirit thereof.

What is claimed is:

1. In a turbine, a cylinder comprising outer cylinder structure, annular inner structure integral with the outer cylinder structure and separating steam spaces which are also separated by expansion elements of the turbine so that the pressure of steam in one space is higher than that in the other, said cylinder including upper and lower halves having cylinder structure and annular structure joint faces, bolts connecting the upper and lower halves of the cylinder and compressively engaging opposed cylinder structure joint faces, said annular structure having the opposed joint faces thereof separated sufficiently to provide expansion clearance spaces for the inner annular structure so that differential expansion of the latter relative to the outer cylinder structure will not separate the cylinder structure joint faces compressively engaged by the bolts, and sealing means for minimizing steam leakage through the expansion clearance spaces from the high-pressure space to the low-pressure space: said sealing means for each clearance comprising a straight groove of uniform width from end to end, formed in the inner annular structure of the upper cylinder half, opening through the joint face of the latter, and extending lengthwise in a direction which is transverse to that of leakage flow from the high-pressure space to the low-pressure space; a roller in the groove, of less diameter than the groove width, bearing on the opposed joint face of the inner annular structure of the lower cylinder half, and arranged to engage a groove wall to effect sealing of the clearance space with variations in the latter.

2. Apparatus as claimed in claim 1 wherein the expansion clearance is provided by inwardly-diverging surfaces provided by having at least one of the opposed annular portion joint faces inclined.

3. Apparatus as claimed in claim 1 wherein the expansion clearance is provided by inwardly-diverging surfaces provided by having the upper cylinder annular structure joint faces inclined so as to diverge with respect to the opposed lower cylinder half annular structure joint faces and in a direction inward from and transverse to the cylinder structure.

4. Apparatus as claimed in claim 1 wherein the groove has end surfaces having close clearance with respect to end surfaces of the roller and provided by flat faces of semi-cylindrical portions of plugs mounted in drilled openings formed in the upper cylinder half annular structure at the ends of the groove.

5. Apparatus as claimed in claim 1 with means provided on the upper cylinder half for retaining each roller in its groove when the upper cylinder half is lifted from the lower half.

6. In a turbine, a cylinder comprising outer cylinder structure, annular inner structure integral with the outer cylinder structure and separating steam spaces which are also separated by expansion elements of the turbine so that the pressure of steam in one space is higher than that in the other, said inner annular structure having radial and interior cylindrical surfaces bounding the space to which steam is supplied from the expansion elements and the high-pressure space being spaced axially from said radial surface and radially outward from said interior cylindrical surface, said cylinder including upper and lower halves having cylinder structure and annular structure joint faces, bolts connecting the upper and lower halves of the cylinder and compressively engaging opposed cylinder structure joint faces, said annular structure having the opposed joint faces thereof separated sufficiently to provide expansion clearance spaces for the inner annular structure so that differential expansion of the latter relative to the outer cylinder structure will not separate the cylinder structure joint faces compressively engaged by the bolts, and sealing means for minimizing steam leakage through the expansion clearance spaces from the high-pressure space to the low-pressure space: said sealing means for each clearance space comprising a straight groove extending radially and parallel to the turbine axis, formed in the inner annular structure of the upper cylinder half, and opening through the joint face of the latter; and a roller in each groove, of less diameter than the groove width, bearing on the opposed joint face of the inner annular structure of the lower cylinder half, and arranged to engage its groove wall to effect sealing of the clearance space with variations in the latter.

References Cited in the file of this patent

UNITED STATES PATENTS

| Number | Name | Date |
|---|---|---|
| 292,537 | Condit | Jan. 29, 1884 |
| 392,931 | Prindle | Nov. 13, 1888 |
| 2,211,874 | Wilson | Aug. 20, 1940 |

FOREIGN PATENTS

| Number | Country | Date |
|---|---|---|
| 511,027 | Great Britain | Aug. 11, 1939 |